(12) United States Patent
Musiol et al.

(10) Patent No.: US 10,305,784 B2
(45) Date of Patent: May 28, 2019

(54) METHODS AND APPARATUS FOR USE IN LOCAL BREAKOUT OR OFFLOAD SCENARIOS

(71) Applicant: NOKIA SOLUTIONS AND NETWORKS OY, Espoo (FI)

(72) Inventors: Torsten Musiol, Ratingen (DE); Mikko Tapani Suni, Espoo (FI); Ole Reinartz, Neuss (DE); Stephan Gruenloh, Osnabrück (DE); Swaminathan Arunachalam, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 136 days.

(21) Appl. No.: 14/914,699

(22) PCT Filed: Aug. 30, 2013

(86) PCT No.: PCT/EP2013/068023
§ 371 (c)(1),
(2) Date: Feb. 26, 2016

(87) PCT Pub. No.: WO2015/028090
PCT Pub. Date: Mar. 5, 2015

(65) Prior Publication Data
US 2016/0212038 A1    Jul. 21, 2016

(51) Int. Cl.
*H04L 12/707*    (2013.01)
*H04L 12/703*    (2013.01)
*H04L 12/24*    (2006.01)
*H04L 12/725*    (2013.01)
*H04L 29/08*    (2006.01)
(Continued)

(52) U.S. Cl.
CPC .......... *H04L 45/22* (2013.01); *H04L 41/0668* (2013.01); *H04L 45/28* (2013.01); *H04L 45/306* (2013.01); *H04L 67/1034* (2013.01); *H04W 40/34* (2013.01); *H04W 8/30* (2013.01)

(58) Field of Classification Search
CPC ...................................................... H04L 45/28
See application file for complete search history.

(56) References Cited

U.S. PATENT DOCUMENTS

| | | | |
|---|---|---|---|
| 7,082,101 B2 * | 7/2006 | Kim | ........................ H04L 12/14 370/225 |
| 8,139,479 B1 * | 3/2012 | Raszuk | ............... H04L 43/0811 370/217 |
| 9,173,117 B2 * | 10/2015 | Haddad | .................. H04W 24/04 |

(Continued)

FOREIGN PATENT DOCUMENTS

WO    WO 2012/113841 A1    8/2012

OTHER PUBLICATIONS

International Search Report & Written Opinion dated Jan. 31, 2014 corresponding to International Patent Application No. PCT/EP2013/068023.

*Primary Examiner* — Shukri Taha
(74) *Attorney, Agent, or Firm* — Squire Patton Boggs (US) LLP

(57) ABSTRACT

A method comprises determining if a failure has occurred in a first path, an offload application server functionality being provided in said first path and if so, causing routing of said data via a second different path which bypasses said offload server functionality.

19 Claims, 6 Drawing Sheets

(51) Int. Cl.
*H04W 40/34* (2009.01)
*H04W 8/30* (2009.01)

(56) References Cited

U.S. PATENT DOCUMENTS

| | | | |
|---|---|---|---|
| 9,338,095 B2* | 5/2016 | Szabo | H04L 47/10 |
| 2006/0271758 A1* | 11/2006 | Innan | G06F 3/0605 |
| | | | 711/170 |
| 2011/0058479 A1 | 3/2011 | Chowdhury | |
| 2012/0017005 A1* | 1/2012 | Twitchell, Jr. | H04L 45/586 |
| | | | 709/232 |
| 2012/0054809 A1* | 3/2012 | Chowdhury | H04N 21/2223 |
| | | | 725/93 |
| 2013/0003534 A1 | 1/2013 | Henry et al. | |
| 2013/0188477 A1 | 7/2013 | Berg et al. | |
| 2013/0324114 A1* | 12/2013 | Raghothaman | H04W 76/023 |
| | | | 455/426.1 |

* cited by examiner

METHODS AND APPARATUS FOR USE IN LOCAL BREAKOUT OR OFFLOAD SCENARIOS

Some embodiments relate to methods and apparatus and in particular but not exclusively to methods and apparatus for use in local break out or offload scenarios.

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or other mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A geographical area covered by a radio access network is divided into cells defining a radio coverage provided by a transceiver network element, such as a base station or Node B. A single transceiver network element may serve a number of cells. A plurality of transceiver network elements is typically connected to a controller network element, such as a radio network controller (RNC).

A user equipment or mobile station may be provided with access to applications supported by the core network via the radio access network or to locally supported applications.

According to an aspect, there is provided a method comprising: determining if a failure has occurred in a first path, an offload application server functionality being provided in said first path; and if so causing routing said data via a second different path which bypasses said offload server functionality.

The first path may be used in preference to said second path.

The second path may provide access to an application via a core network.

The determining may comprise using a bidirectional forwarding detection protocol.

A control path may be used for said determining if a failure has occurred.

The control path may be parallel with or part of the first path.

The first path may comprises a first part between a router of a base station and a router of the offload application server functionality and a second part between said router of the offload application server functionality and a first hop router.

The second path may comprise a part between said router of said base station and said first hop router.

If a failure is determined in said first path, said method may comprise updating a routing table with at least one address associated with said second path.

The method may comprise causing information to be sent to at least one other entity on said first path if a failure is determined.

According to another embodiment, there is provided an apparatus which is configured to perform the previous method (s).

A computer program comprising program code means adapted to perform the method(s) may also be provided. The computer program may be stored and/or otherwise embodied by means of a carrier medium.

According to another embodiment, there is provided an apparatus comprising at least one processor and at least one memory including computer code for one or more programs, the at least one memory and the computer code configured, with the at least one processor, to cause the apparatus at least to: determine if a failure has occurred in a first path, an offload application server functionality being provided in said first path; and cause routing of said data via a second different path which bypasses said offload server functionality if a failure is determined in said first path.

The at least one memory and the computer code may be configured, with the at least one processor, to use said first path in preference to said second path.

The second path may provide access to an application via a core network.

The at least one memory and the computer code may be configured, with the at least one processor, to cause the apparatus to use a bidirectional forwarding detection protocol to determine if a failure has occurred in said first path.

The at least one memory and the computer code may be configured, with the at least one processor, to use a control path for said determining if a failure has occurred.

The control path may be parallel with or part of the first path.

The first path may comprises a first part between a router of a base station and a router of the offload application server functionality and a second part between said router of the offload application server functionality and a first hop router.

The second path may comprise a part between said router of said base station and said first hop router.

The at least one memory and the computer code may be configured, with the at least one processor, to cause the apparatus to update a routing table with at least one address associated with said second path, if a failure is determined in said first path.

The at least one memory and the computer code may be configured, with the at least one processor, to cause the apparatus to cause information to be sent to at least one other entity on said first path if a failure is determined.

According to another aspect, there is provided an apparatus comprising: means for determining if a failure has occurred in a first path, an offload application server functionality being provided in said first path; and means for causing routing of said data via a second different path which bypasses said offload server functionality if a failure is determined in said first path.

The first path may be used in preference to said second path.

The second path may provide access to an application via a core network.

The determining means may use a bidirectional forwarding detection protocol.

A control path may be used for said determining if a failure has occurred.

The control path may be parallel with or part of the first path.

The first path may comprises a first part between a router of a base station and a router of the offload application server functionality and a second part between said router of the offload application server functionality and a first hop router.

The second path may comprise a part between said router of said base station and said first hop router.

The apparatus may comprise means for updating a routing table with at least one address associated with said second path, if a failure is determined in said first path.

The apparatus may comprise means for causing information to be sent to at least one other entity on said first path if a failure is determined.

The apparatus may be provided in one or more of a router, a router at a base station, a first hop router, a router of an application server functionality, a base station and an application server functionality.

In the above, many different embodiments have been described. It should be appreciated that further embodiments may be provided by the combination of any two or more of the embodiments described above.

Embodiments are described below, by way of example only, with reference to the accompanying drawings, in which.

Figure 4:
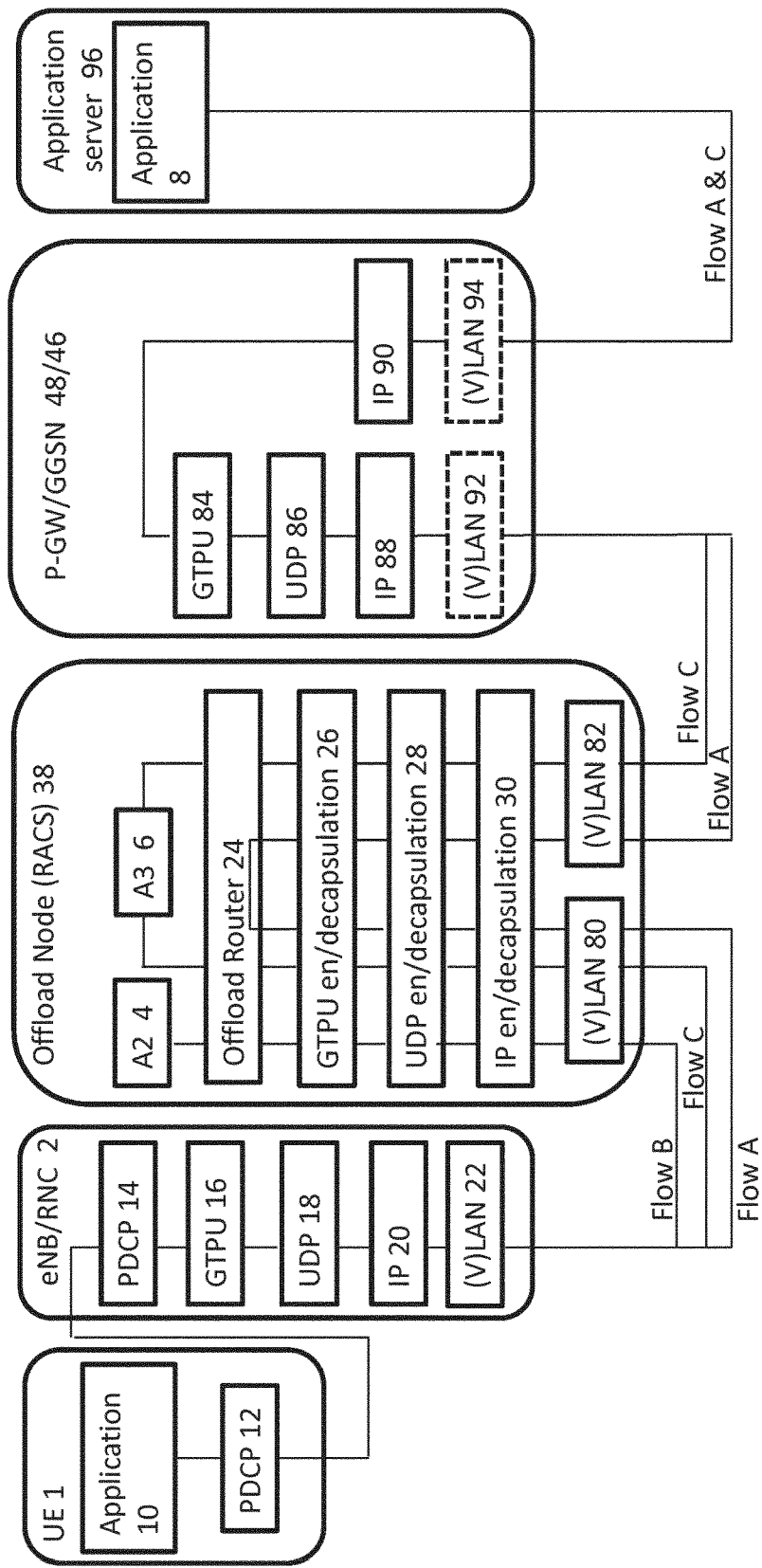
Figure 5:
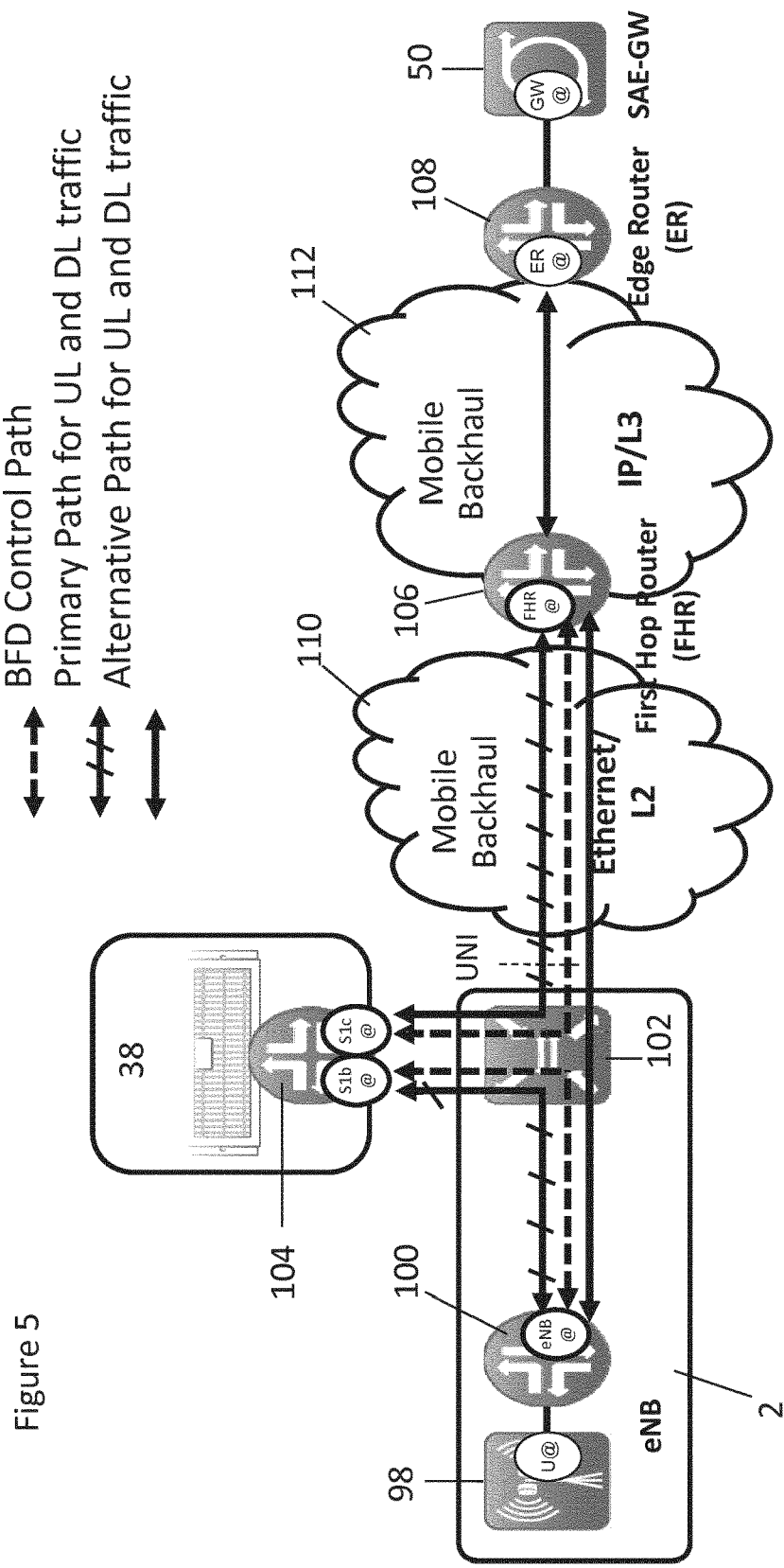
Figure 6:
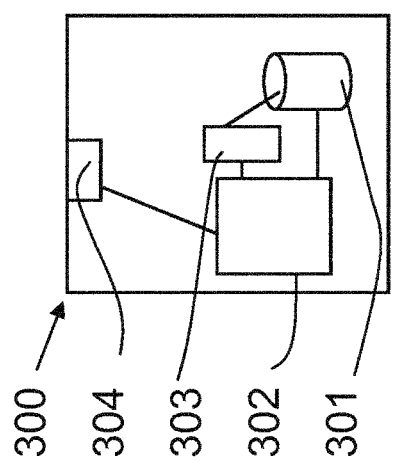

FIG. 4 schematically shows inline offload architecture data flows;

FIG. 5 schematically shows an arrangement which supports rerouting of application related traffic; and FIG. 6 shows a control apparatus Embodiments may be used where there are local break out and off load solutions. This may be in the context of a 3GPP radio environment or any other suitable environment. In some embodiments, applications may be deployed to offload points using for example cloud style application deployments.

Local breakout function may provide a mechanism to serve traffic by local applications. In other words, Internet content or the like is brought to a local breakout point. There are many use cases of localization. By way of example, this may be one or more of a local content delivery network (CDN), local transparent caching, local content optimization for a mobile terminal and/or network, local hosting of other kind of services (used by mobile terminals), and local serving of machine-to-machine (M2M) terminals, for example aggregation functions or the like.

Local breakout may be applied alternatively or additionally to other types of radio networks, such as Wi-Fi, WiMax and Femto network. In such embodiments the offload may be between core network and Internet transit/peering.

Some embodiments may integrate a server module or function into the RAN (Radio Access Network). This application server function may be considered to be a RACS (Radio Applications Cloud Server). It should be appreciated that this application server function may be a cloud server or any other suitable server. The RAN may be provided by one or more entities. In some embodiments, the RAN may comprise a BTS (base transceiver station) to which an RNC (radio network controller) has been integrated or RNC in a 3G networks, or an eNB (enhanced Node B) in LTE (Long term evolution). It should be appreciated that other embodiments may alternatively or additionally be used in conjunction with any other suitable standard or system.

The application server function may enable the deployment and hosting of local applications at the RAN side in a virtualization computing environment and/or the applying cloud technologies. The "leaky bearer" offload concept may be applied to gain access to the mobile bearer traffic flows. The traffic flows may be IP traffic flows. By way of example the IP traffic flows may comprise one or more of PDP (packet data protocol) context and EPS (evolved packet system) bearer.

Local breakout scenarios are specified in 3GPP release 10 under the name SIPTO (selected IP traffic offload). One of the concepts for 3G networks is the so-called "leaky bearer" traffic flow break-out, also called TOF (Traffic offload). It allows extracting or inserting IP flows of an existing mobile bearer based on activated IP flow traffic filters. This is a flexible break-out concept without involvement of or impact on the UE (user equipment). The concept provides local access to mobile bearer traffic flows and in this way is used for the deployment and execution of applications at the RAN like CDN (content delivery network) solutions, content delivery optimization, caching solutions or others. These local applications may benefit from the proximity to the radio (e.g. location awareness, lower latency) and of having access to radio information, e.g. radio cell load, location, UE's specific radio condition.

It should be appreciated that some embodiments may alternatively or additionally use different local breakout techniques other than those discussed above.

Figure 1:
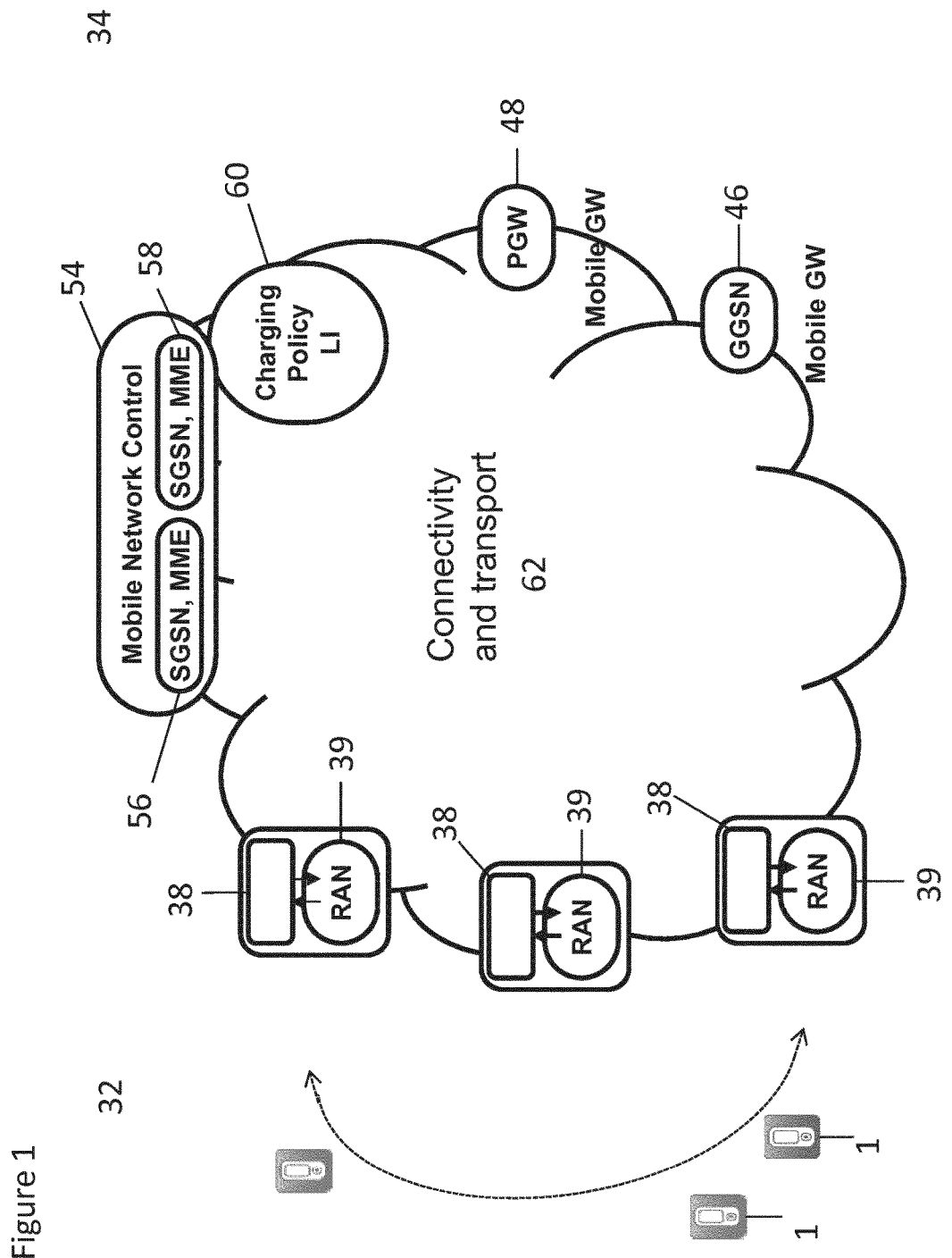
FIG. 1 shows a schematic general overview of a radio access network and a core network according to some embodiments.

Reference is now made to FIG. 1 which shows one example of a schematic architecture. In this example, an application server function 38 may be integrated at the RAN 39 level with an off load capability. The applications which may be supported by the architecture may have distributed and centralized components.

The network architecture broadly comprises a radio access side 32 and a mobile packet core 34. The radio access side comprises user equipment 1. The user equipment are configured to communicate with a respective radio access network. In FIG. 1, first, second and third radio access networks 39 are shown. Each RAN may comprise one or more access nodes. The access nodes may comprise any suitable access node. Depending on the standard involved, the access node may be a base station such as a node B with at least some RNC functionality or an enhanced node B. The latter refers to the Long Term Evolution (LTE) of the Universal Mobile Telecommunications System (UMTS) standardised by 3GPP (Third Generation Partnership Project). A controller for the base stations may be provided. In some standards, the controller may be a radio network controller. The radio network controller is able to control the plurality of base stations. In other embodiments, a distributed control function is provided and each base station incorporates part of that control function.

Each of the RAN shown in FIG. 1 is provided with a server such as an application server function. The application server function 38 may be provided by a separate entity or may be integrated with one or more other entities.

The application server function may be integrated with a base station 39 having at least some RNC functionality and/or RNC or any other type of controller. It should be appreciated that other embodiments are additionally or alternatively envisaged such as where server functionality is integrated into a node of the RAN, for example the RNC or the base station having for example RNC functionality. In some embodiments, a physical realisation would be a RNC/base station plus server in a same integrated hardware. In some embodiments the physical realisation or hardware may be different. A physical realization may be different (for example an integrated one), even though the software functionality may be the same or similar, in some embodiments.

The mobile packet core 34 comprises a mobile gateway node 46 and 48. The mobile gateway 46 may be a GGSN (gateway GPRS (General Packet Radio Service) support node) and the mobile gateway 48 may be a (PDN-GW) packet data network gateway. These gateways are by way of example. One or more other types of gateway may additionally or alternatively be provided in different embodiments. Only one type of gateway may be provided in some embodiments. More than one type of gateway may be provided in other embodiments.

The mobile packet core 34 also comprises a mobile network control part 54. This part comprises SGSNs (serving GPRS Support Node) and MMEs (mobile management entities) entities 56 and 58.

In some embodiments, the mobile packet core 34 may comprise a function 60. This function may provide one or more of a lawful intercept function which allows authorised authorities to monitor communications, a policy control function and a charging control function. One or more of these functions may be provided separately and/or in different combinations.

The radio access part 32 is able to communicate with the mobile packet core via connectivity and transport function 62.

The application server function 38 may host applications, which can be accessed by subscribers via leaky bearer traffic offload. For example, a subscriber can access applications hosted by the server 38 via the offload of respective IP flows of the subscriber's mobile bearer to the corresponding application.

Figure 2:
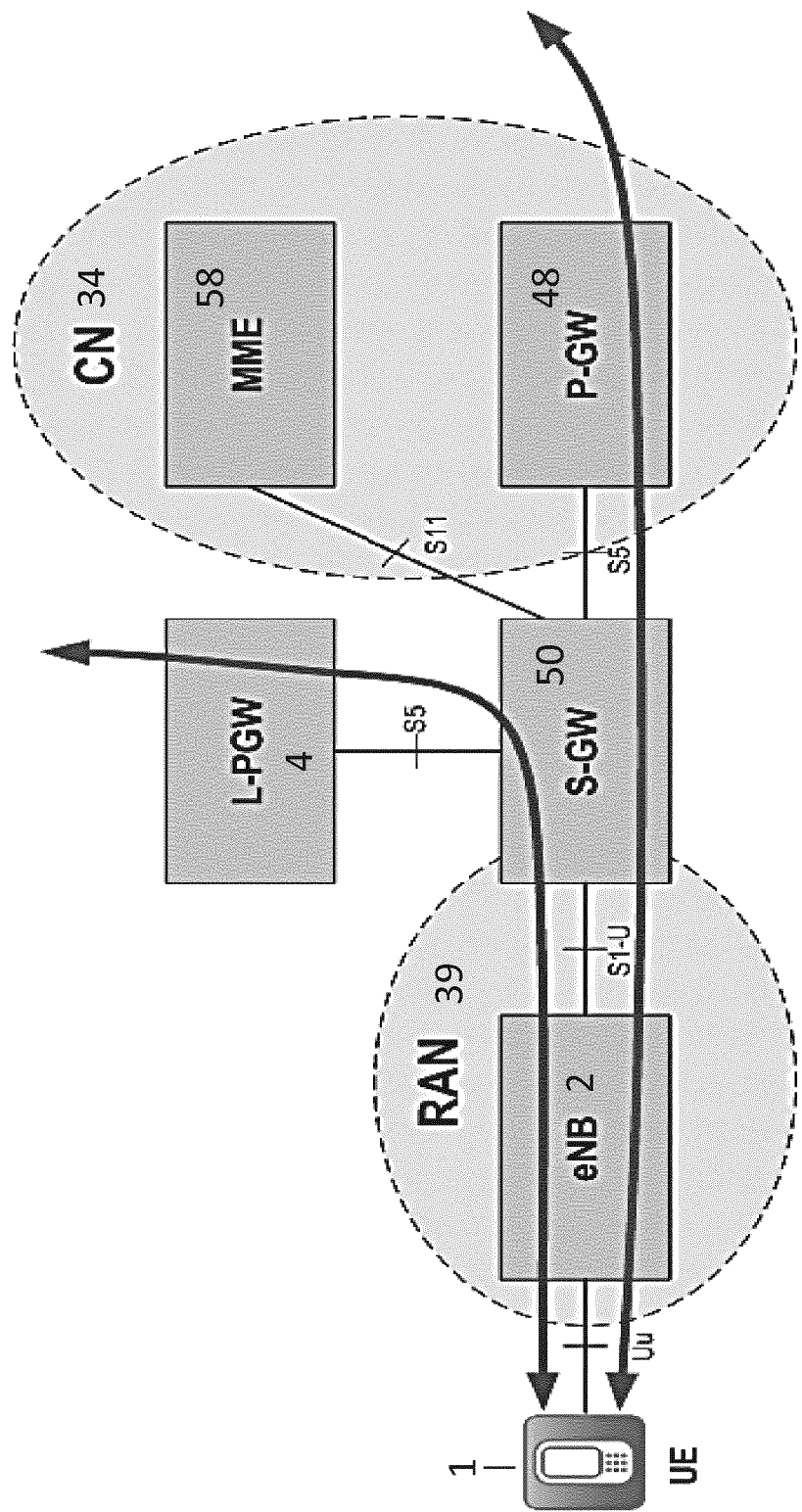
FIG. 2 shows a an example of an architecture used for some break out applications.

Reference is made to FIG. 2 which shows the SIPTO system architecture. As mentioned previously, the SIPTO architecture supports the so called 'leaky bearer' traffic flow break out, also called traffic off load (TOF).

FIG. 2 shows a core network traffic flow. The path between the user equipment 1 and the core network 34 is defined as follows: user equipment to the node B 2 to S-GW 50 to P-GW 48. It should be appreciated that this path may be bidirectional.

FIG. 2 also shows offload or SIPTO traffic. For SIPTO traffic, the path is defined as user equipment 1 to the eNodeB 2 to S-GW 50 to L-PGW (local packet gateway) 4. Again, the traffic may be bidirectional.

This concept allows extraction and/or insertion of IP flows of an existing mobile bearer based on activated IP flow traffic filters using L3 (IP Internet Protocol) and L4 header filter rules (TCP/UDP—transmission control protocol/user datagram protocol).

This may be a flexible breakout concept without involving or impacting on the user equipment. Thus, this architecture provides local access to mobile bearer traffic flows and allows for the deployment and execution of applications at the RAN. Such applications may be a CDN (content delivery network), content delivery optimisation, caching solutions and/or the like. These local applications may benefit from the proximity to the radio, for example location awareness, low latency and/or the like, having access to radio information, for example radio cell load, location, a user equipment's specific radio condition and/or the like.

Figure 3:
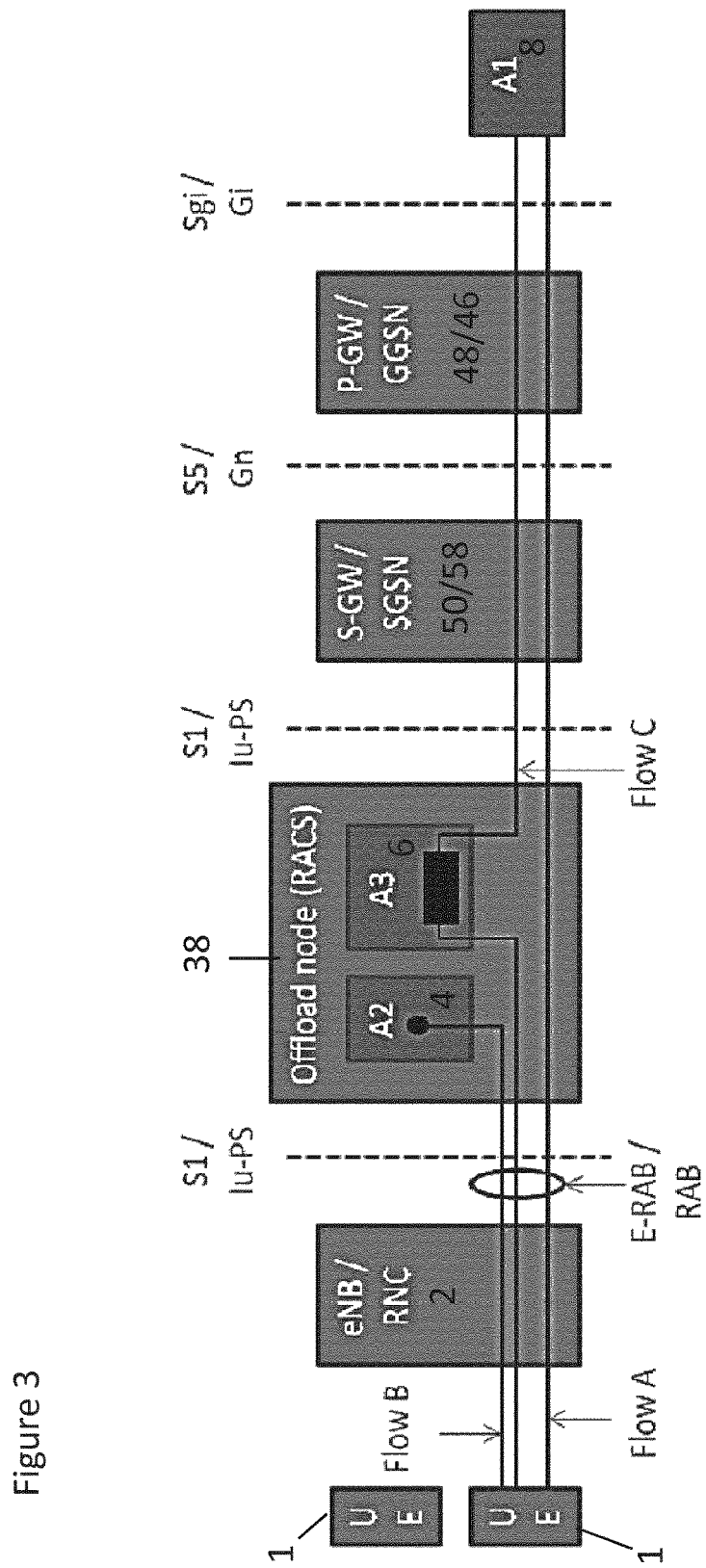
FIG. 3 shows a radio access inline offload system architecture.

Reference is now made to FIG. 3 which shows a radio access in line offload system architecture and three flows associated with different applications.

The arrangement of FIG. 3 is applicable to, for example, an E-UTRAN/network (evolved UMTS terrestrial radio access network). The off load node, that is the application server functionality 38 may sit between the eNodeB/RNC and S-GW on for example an S1 interface or may be provided between the RNC/BTS and SGSN on an Iu-PS interface. These interfaces may be between the eNodeB/RNC and the S-GW/SGSN. It should be appreciated that the offload node or application server functionality can be provided in any suitable location as discussed previously.

FIG. 3 shows three different traffic flow scenarios. Flow A is the case where the user equipment communicates with an application A1 located behind the SGi/Gi interface, without offloading. The SGi/Gi interface is between the P-GW/GGSN and the A1 application. In other words, the application is reached via the core network.

Flow B shows an example where the traffic flow is offloaded and the user equipment communicates with a local application A2 at the application server functionality 38. As can be seen, the path between the user equipment and the application A2 is via the eNodeB/RNC 2.

The third flow, flow C represents a hybrid case where the user equipment may communicate with the first application A1 but the traffic is routed through application A3. Application A3 is provided in the application server function. The application A3 may follow or alter the traffic flow between the user equipment and application A1. In other words, the third flow C is defined between the user equipment and the application A1 as follows: user equipment to the eNodeB/RNC 2 to application A3 provided in the local application functionality to S-GW/SGSN 50/58 to P-GW/GGSN 48/46 to the application A1.

Reference is now made to FIG. 4 which shows the in-line offload architecture of FIG. 3 with the data flows. In order to implement offload for the second and third flows B and C, the application server functionality 38 sees all the GTP-U (GPRS (general packet radio service) tunnelling protocol) tunnelled user plane traffic of the S1 or Iu-PS interface. The application server functionality 38 has an offload router that works based on L3/L4 filter rules. Prior to this, the application server functionality 38 will need to parse through outer IP, UDP and GTPU headers. The application server functionality may decide if the flow is flow A, flow B or flow C.

The user equipment has an application layer 10 and a PDCP layer (packet data convergence protocol) layer 12. The eNodeB/RNC 2 has a PDCP layer 14, a GTPU layer 16, a UDP layer 18, an IP layer 20 and a (V)LAN (virtual local area network) 22. The application server functionality in addition to the two applications A2 and A3, comprises an off load router 24, a GTPU encapsulation/decapsulation function 26, a UDP encapsulation/decapsulation function 28, an IP encapsulation/decapsulation function 30, a first VLAN 80 interfacing with the eNodeB/RNC 2 and a second VLAN 82 interfacing with the P-GW/GGSN 48/46.

The P-GW/GGSN 48/46 has a first VLAN 92, an IP layer 88, UDP layer 86, a GTPU layer 84, a second IP layer 90 and a second VLAN 94.

For all flows from the UE, the path taken is initially as follows: starting in the user equipment application layer 10 then the PDCP layer 12. Moving next to eNodeB/RNC 2, the flow is the PDCP layer 14 followed by GTPU layer 16 followed by UDP layer 18 followed by the IP layer 20 followed by the VLAN 22.

All of the flows are then proved to the application server functionality 38 and initially to the first VLAN. The path is then to the IP encapsulation/decapsulation function 30, the UDP encapsulation/decapsulation function 28, then the GTPU encapsulation/decapsulation function and the off load router 24. For each of these encapsulation/decapsulation functions, a decapsulation function will be performed. The off load router 24 will route traffic flow B to the second application A2. The offload router will route flow C to the third application A3 which is then returned from that application to the offload router 24. The offload router will route the output flow C from the third application A3 and the flow A traffic back to the GTPU encapsulation/decapsulation function 26, then the UDP encapsulation/decapsulation function 28, then the IP encapsulation/decapsulation function 30 and then to the second VLAN 82. The encapsulation/decapsulation functions from the offload router are performing encapsulation functions.

Flows A and C then follow the same path through the P-GW/GGSN 48/46. This path is the first VLAN 92, IP layer 88, UDP layer 86, GTPU layer 84, second IP layer 90 and the second VLAN 94. From there, flows A and C are routed to the application server 96 supporting the application A1.

At a physical level, the application server functionality looks like a physical media that passes type A traffic flows through, offloads type B traffic flows and mangles type C flows.

At an Ethernet level, the application server functionality may look like an Ethernet bridge the passes type A flows through, offloads type B traffic flows and mangles type C traffic flows.

At an IP level, the application server function looks like an IP router that passes type A traffic flows through, offloads type B traffic flows and mangles type C flows. The IP level solution may provide flexibility in terms of location and connectivity of the application server function. This may allow the application server functionality to be part of the eNodeB and/or RNC or allow that application server functionality to be remote from the eNodeB and/or RNC. This may also allow one or more L2 nodes between the application server functionality and the eNodeB and/or RNC.

Some embodiments may consider the IP level. However it should be appreciated that alternative embodiments may alternatively or additionally consider one or more of the physical level or Ethernet level.

Some embodiments may address the issue where there is a failure of the application server functionality. In some embodiments, the application server functionality may appear as a router on the S1 or Iu-PS interface.

The offload server functionality may have one or more possible failures:
- at a physical level, the cable may become faulty;
- at an interface level, a link towards one of the nodes (which nodes are you talking about here) becomes faulty;
- at a network level, connectivity from the offload server functionality to the S-GW/SGS and may become faulty;
- at a computing hardware level, the offload server functionality may fail to execute software;
- at an operating system software level, the application server functionality does not execute software such as the offload router software; and
- the offload router software malfunctions meaning that it is unable to select or forward packets.

It should be appreciated that in some embodiments, the offload routers may be able to detect and bypass faulty applications.

In some embodiments, it is possible to restore connectivity for type A and type C traffic flows bypassing the application server functionality until recovery after the failure has occurred.

In some embodiments, the application server functionality may be brought back into operation after recovery after failure. This would then provide the type B traffic flow again.

In some embodiments, breakout may be achieved by breaking into the S1 interface, in case of an LTE system or Iu interface in the case of a 3G system. The application server functionality will be provided such that its presence is transparent to the eNodeB/S-GW in the case of LTE or the RNC/SGSN in the case of 3G. In some embodiments, there may be transparency with respect the RNC/GGSN with the use of direct tunnelling.

Some embodiments may use path supervision. Some embodiments may alternatively or additionally use IP routing principles.

In some embodiments, BFD (bidirectional forwarding detection) may be used. In some embodiments, that may be a single hop mechanism. Some embodiments may alternatively or additionally support IP rerouting.

Reference is made to FIG. 5 which shows an embodiment. The radio access network comprises an eNodeB 2. The eNodeB 2 has a wireless part 98 and an IP router 100. Also provided is an integrated Ethernet switch 102. The application server functionality is also provided with an integrated IP router 104 which can be considered to be an offload router.

A first mobile backhaul network 110 is provided between the Ethernet switch 102 and a first hop router FHR 106. The first mobile backhaul network 110 is an Ethernet/L2 network.

A second mobile backhaul network 112 is provided between the first hop router 106 and an edge router 108. The second mobile backhaul network 112 is IP/L3 network. The edge router 108 is arranged to communicate with the SAE-Gateway. The BFD functionality is provided between the IP router of the eNB and the IP router of the application server function and between the IP router of the application server function and the first hop router. The BFD function is provided between the first hop router and the eNB router.

The BFD functions to determine if the path between the respective router is still function or if there has been a failure in that path.

BFD is used to detect path failures, as the switch over to the alternative path is to be done if the primary path fails. The BFD function itself may be provided by control apparatus. This control apparatus may be provided in one or more of the routers (100, 104 and 106), as the function is based on IP.

FIG. 6 shows an example of a control apparatus. The control apparatus 300 comprises at least one memory 301, at least one data processing unit and an input/output interface 304. In the apparatus shown in FIG. 6, two processing units 302 and 303 are shown. However in some embodiments, one of these data processing units may be omitted. In other embodiments, more than two processing units may be provided. In the embodiment of FIG. 6, one memory is shown. Some embodiments may be provided with more than one memory. Via the interface the control apparatus can be coupled to a receiver and/or transmit data. For example the control apparatus 300 can be configured to execute an appropriate software code to provide the control functions. The control apparatus may control which path is used and the switching to another path in the event of a path failure.

It should be appreciated that this control apparatus may be provided in the application server functionality and/or the eNode B and/or the FHR and may be used to support route selection. This route selection is described in more detail later.

The BFD establishes a session between two endpoints over a path. The direct route to an application server function is supervised by the BFD. In some embodiments, the BFD will establish a session between the eNodeB and the application server. This session will involve the IP router 100 of the eNodeB and the IP router 104 of the application server functionality. The BFD will also establish a session between the application server functionality and the first hop router 106. Again, it should be appreciated that the session will be established with the router 104 of the application server functionality. The sessions define a primary or preferred path.

An alternative path is defined by a session between the router of the eNB and the first hop router. This alternative path may be less preferred than the primary path. Both the primary path and the alternative path may pass via the Ethernet switch.

The first hop router may be the first router in the radio backhaul network. Depending on implementation, there may be one or more additional routers between the first hop router 106 and the edge router 108. In some alternative embodiments, the first hop router and the edge router may be provided by a single router In some embodiments, to provide high availability at the router level, the first hop router may be implemented as a redundant pair of routers. However, in some embodiments, there may be a single first hop router. In other embodiments, there may be more than two first hop routers.

As will be described in more detail, embodiments may be able to protect against the failure of one or more of the following:

L2 network between the application server function and first hop router (or a redundant pair of first hop routers in the case of the redundant router configuration); the link between the application server function and the eNodeB;
application server hardware and/or software; and
one of the redundant first hop routers (in the case that redundant pair of routers is used).

In some embodiments, in the event of failure, the application server function may be able to define the preferred primary path and an alternative path in the L2 network. The alternative path may be used in the event that the primary path is unavailable. The application server functionality may alternatively or additionally be able to reroute traffic from a failed path to a working path. For example, in the event of the primary path failing, the traffic may be rerouted to the alternative path. In some embodiments, the switching from one path to another may be done with a switch over time which is tolerable for an end user.

In some embodiments, the application server function may trigger the redundancy mechanism (that is switching from an unavailable path to an available path) in the eNodeB and/or first hop router when the BFD session(s) associated with downlink and/or uplink data connectivity fails on the egress side of the application server function. This redundancy mechanism may transfer the egress link BFD state to the ingress link BFG state. The application server functionality may inform the eNodeB and/or the first hop router to select the alternative route.

In some embodiments, the uplink may be supported by IP re-routing in the eNB. This may be relatively fast re-routing. The traffic of eNB through the application server functionality (primary path) may be protected. Depending on the primary path BFD's supervision status, the eNB may transport its traffic either over the primary Path or the alternative path as depicted in FIG. 5.

The application server functionality's eNB related IP address (S1b @) may be configured in the eNB as the next hop to reach the SGW (for the primary route) and the secondary route is configured via the first hop router address (FHR@).

The eNB-application server functionality connection may be supervised by the eNB with BFD. This BFD may be single hop. The application server functionality-FHR connection is supervised by application server functionality (ASF) with BFD. Again this BFD may be single hop.

TABLE 1

Route Selection in eNB.

| session state | Up | Down |
|---|---|---|
| Action | The route with the lower route preference value is chosen. | When the BFD bound primary static route is inactive, the route is removed from the routing table in the eNB router 100 and the next BFD bound static route (e.g. direct route to the FHR in the back haul) is chosen. |
| Result | Primary path (eNB-ASF -FHR) is used. | Alternative Path (eNB-FHR) is used. |

The above table, table 1 summarises the route selection in the eNB depending on if the eNB-application server functionality BFD state is up or down.

TABLE 2

Uplink Supervision and handling in application server functionality.

| Session state | Up | Down |
|---|---|---|
| Action | Only one static route and no protection scheme. | When the BFD bound static route is inactive, the application server functionality informs the eNB of the path failure through a BFD control message. The eNB handles the path failure the same as if the eNB application server functionality BFD session state is down. (see previous table) |
| Result | Primary path - static route from application server functionality to FHR | eNB's alternative path. (application server functionality bypassed) is used. |

The above table, table 2 summaries the uplink supervision and handling in the application server functionality depending on whether the application server functionality-first hop router session state is up or down.

In some embodiments, the downlink is supported by respective functionality in the first hop router. The traffic of the FHR through application server functionality (primary path) is protected. Depending on the primary path BFD's supervision status, the FHR transports its traffic either over the primary path or the alternative path as shown in the FIG. 5.

The application server functionality's core related IP address (Sic @) is configured in the FHR as next hop to reach the eNB address (the primary route) and the secondary route is configured directly to eNB address (eNB).

The FHR-application server functionality connection is supervised by the FHR with BFD (preferably single-hop). The application server functionality-eNB connection is supervised by application server functionality with BFD (preferably single-hop).

TABLE 3

Route Selection in FHR.

| Session state | Up | Down |
|---|---|---|
| Action | The route with the lower route preference value is chosen. | When the BFD bound primary static route is inactive, the route is removed from the routing table in the first hop router and the next BFD bound static route (direct route to the eNB) is chosen. |
| Result | Primary Path (FHR-ASF) is used. | Alternative Path (FHR-eNB) is used |

Table 3 above summarises the route selection in the FHR depending on if the session state between the FHR and the application server is up or down.

TABLE 4

Downlink supervision and handling in application server functionality.

| Session state | Up | Down |
|---|---|---|
| Action | Only one static route and no protection scheme. | When the BFD bound static route is inactive, application server functionality informs the FHR of the path failure through a BFD control message. FHR handles the path failure same as FHR application server function BFD session state down. |
| Result | Primary Path - static route from application server functionality to eNB | FHR Alternative Path (application server functionality bypass) is used |

Table 4 above summaries the downlink handling in the application server functionality depending on if the session state between the FHR and the application server is up or down.

At least one of application server functionality hardware failure, system software failure and operating system failure causes failure of one or both the BFD sessions (eNB-application server functionality and FHR application server functionality).

An application server functionality router software failure may be handled within the application server functionality by forwarding the traffic to eNB or to FHR without doing an offload to one or more applications depending on if downlink or uplink.

An application server functionality failure may be reflected as a BFD supervision failure, thus causing IP re-routing in the eNB and FHR.

BFD is a protocol intended to detect faults in the bidirectional path between two nodes which are forwarding nodes. BFD may operate independently of for example data and/or routing protocols.

BFD is a standardised means of solving the problem of supervising several paths and providing for routing table changes in case of a failure. Alternatively or additionally, other protocols can be used (e.g. OSPF-open shortest path) or adapted (e.g. ICMP (internet control message protcol) echo). The BFD control path is provided in parallel with the primary and alternative path to control which of the paths is used.

An appropriately adapted computer program code product or products may be used for implementing some embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
    determining when a failure has occurred in a first path, wherein an offload application server functionality is provided in said first path, wherein the offload application server functionality is configured to offload at least one traffic flow to a local application,
    wherein said first path comprises a first part between an internet protocol router of a base station and an offload router of the offload application server functionality and a second part between said offload router of the offload application server functionality and a first hop router; and
    when it is determined that a failure has occurred in the first path, causing routing of data via a second different path which bypasses said offload server functionality, wherein said second path comprises a path between the internet protocol router of the base station and the first hop router.

2. The method as claimed in claim 1, wherein said first path is used in preference to said second path.

3. The method as claimed in claim 1, wherein said second path provides access to an application via a core network.

4. The method as claimed in claim 1, wherein said determining comprises using a bidirectional forwarding detection protocol.

5. The method as claimed in claim 1, wherein a control path is provided for said determining if a failure has occurred.

6. The method a claimed in claim 5, wherein said control path is parallel with or part of the first path.

7. The method as claimed in claim 1, wherein said second path comprises a part between said router of said base station and said first hop router.

8. The method as claimed in claim 1, wherein when a failure is determined in said first path, said method comprises updating a routing table with at least one address associated with said second path.

9. The method as claimed in claim 1, comprising causing information to be sent to at least one other entity on said first path if a failure is determined.

10. An apparatus comprising:
at least one processor; and
at least one memory including computer code for one or more programs, the at least one memory and the computer code configured, with the at least one processor, to cause the apparatus at least to:
determine when a failure has occurred in a first path, wherein an offload application server functionality is provided in said first path, and wherein the offload application server functionality is configured to offload at least one traffic flow to a local application,
wherein said first path comprises a first part between an internet protocol router of a base station and an offload router of the offload application server functionality and a second part between said offload router of the offload application server functionality and a first hop router; and
cause routing of data via a second different path which bypasses said offload server functionality when a failure is determined in said first path,
wherein said second path comprises a path between the internet protocol router of the base station and the first hop router.

11. The apparatus as claimed in claim 10, wherein the at least one memory and the computer code are configured, with the at least one processor, to cause the apparatus to use the first path may be used in preference to said second path.

12. The apparatus as claimed in claim 10, wherein the second path provides access to an application via a core network.

13. The apparatus as claimed in claim 10, wherein the at least one memory and the computer code are configured, with the at least one processor, to cause the apparatus to use a bidirectional forwarding detection protocol to determine if a failure has occurred in said first path.

14. The apparatus as claimed in claim 10, wherein the at least one memory and the computer code are configured, with the at least one processor, to use a control path for determining if a failure has occurred.

15. The apparatus as claimed in claim 14, wherein the control path is parallel with or part of the first path.

16. The apparatus as claimed in claim 10, wherein the second path comprises a part between said router of said base station and said first hop router.

17. The apparatus as claimed in claim 10, wherein the at least one memory and the computer code are configured, with the at least one processor, to cause the apparatus to update a routing table with at least one address associated with said second path, when a failure is determined in said first path.

18. The apparatus as claimed in claim 10, wherein the at least one memory and the computer code are configured, with the at least one processor, to cause the apparatus to cause information to be sent to at least one other entity on said first path if a failure is determined.

19. A computer program product embodied on a non-transitory computer-readable medium, said product comprising computer executable instructions which, when run on a computer, cause the method of claim 1 to be performed.

* * * * *